United States Patent [19]

Wong

[11] Patent Number: 4,734,313

[45] Date of Patent: Mar. 29, 1988

[54] COATED PLASTIC SHEET MADE OF PP NON-WOVEN AND ITS MANUFACTURING METHOD

[76] Inventor: Winston W. Wong, 201, Tung Hwa N. Rd., Taipei, Taiwan

[21] Appl. No.: 907,874

[22] Filed: Sep. 16, 1986

[51] Int. Cl.⁴ .............................................. B32B 3/12
[52] U.S. Cl. .................................. 428/159; 428/172; 428/215; 428/286; 428/288
[58] Field of Search ............... 428/159, 172, 286, 288, 428/215

[56] References Cited

U.S. PATENT DOCUMENTS 4,556,589 12/1985 Neumann ............................ 428/286

Primary Examiner—Marion C. McCamish
Attorney, Agent, or Firm—Bucknam and Archer

[57] ABSTRACT

A coated plastic sheet made of non-woven polypropylene with embossed or plain surface. Since non-woven polypropylene is water impermeable and water repellent, a plastisol or a resin is applied directly for embossing on the entire surface, or partially embossing to form embossed pattern after a special treatment such as spraying with polyvinyl chloride or applying an ink or paste to form a light, plastic sheet of superior quality at low cost.

8 Claims, 3 Drawing Figures

COATED PLASTIC SHEET MADE OF PP NON-WOVEN AND ITS MANUFACTURING METHOD

The present invention relates to plastic sheets made with a base layer made of a non-woven fabric of polyproplene.

DESCRIPTION OF THE PRIOR ART

At present plain woven fabric, knitted fabric or non-woven made of fibers is used as base layer for plastic sheets. One or more plastic layers is bonded to the base layer to form a plastic sheet. The methods of manufacture include:

(1) A base fabric is pasted, dried and then bonded to one or more layers of foamed or unfoamed plastic films, foamed and finally embossed. Polyvinyl chloride is used frequently.

(2) A paper stencil is coated with a layer of non-foaming material, a layer of foamable material, a layer of paste, base fabric is adhered to it before foaming. The pattern of the paper stencil may be the pattern of its surface, or it may be embossed separately. The material used is polyvinyl chloride or polyurethane.

(3) A base fabric is coated with a layer of polyurethane resin. This method gives a wet type polyurethane sheet after thermosetting and rinsing.

The products made by the above methods have the following defects:

(1) The base fabric is discolored and weakened during foaming at high temperature, and consequently, the flexibility of the finished products is not satisfactory. The use of plain woven fabric results in yarn breaking during processing and cutting because it is composed of warp and weft yarns.

(2) The paper stencil is indispensable for the method with coating by means of paper stencil but the rate of production is low and this step involves an additional cost.

(3) There is a pollution problem due to the solvent required in making wet type PU sheet, the rate of production is low and the cost is high.

(4) The base fabric made of fibers or artificial fibers is heavy and consequently the finished product is heavy.

THE PRESENT INVENTION

A polypropylene (PP) spray spinning type non-woven base fabric is used. A polyvinyl chloride (PVC) film is applied to cover first the entire surface, and then a coating is applied as the uppermost layer to form a plastic sheet made of non-woven PP.

DESCRIPTION OF THE DRAWINGS

By reference to the drawings,

FIG. 1 illustrates the step of spraying the film; FIG. 2 illustrates the coating step and FIG. 3 illustrates the product of the present invention. The PP non-woven 1 is used as a base fabric of the plastic sheet. The method of manufacture consists of heating fiber-grade PP resin to melt and then spray them to form a web, and finally, thermoset to form PP non-woven fabric. It has the merit of being PP-light, water repellent and economical. Further, since continuously sprayed fiber-yarn will break when cut and since pores exist on the sprayed fibers, a film extruded from a PVC resin of a particular formula by means of T-Mold must be spread on it as a filler 2 or coating layer as shown in FIG. 3. The uppermost layer is a coating on which a pattern may be embossed or printed to form a plastic sheet as shown in FIG. 3.

The formulations used in the present invention are:

| Granules for PVC Film Spraying | |
|---|---|
| PVC resin | 50–100 parts |
| VC-VAC (vinyl chloride-vinyl acetate) copolymer | 0–50 parts per 100 parts of resin |
| Plasticizer | 50–100 parts per 100 parts of resin |
| Stabilizer | 3–9 parts per 100 parts of resin |
| Lubricant | 0–1 parts per 100 parts of resin |
| Dye | 0–6 parts per 100 parts of resin |
| Plastisol uppermost layer | |
| PVC resin | 60–100 parts |
| Thermoplastic Rubber | 0–40 parts per 100 parts of resin |
| Plasticizer | 0–100 parts per 100 parts of resin |
| Stabilizer | 1–5 parts per 100 parts of resin |
| Filler | 0–50 parts per 100 parts of resin |
| Dye | 5–20 parts per 100 parts of resin |

The method of manufacture according to the present invention is described below:

Method in each step:

1. PP Non-Woven

PP, fiber-grade—(a) Melting; (b) Extrusion; (c) Spray Spinning; (d) Thermal Setting—the product is PP Non-woven fabric 2. PVC granules for PVC film spreading The PVC resin and other components are extruded, the product is granulated and granules for film spreading are obtained.

3. Plastisol

The components of the formulation are mixed to form a paste. Then they are placed in a container by means of the Feeder Roll. Coating is carried out with the coating roller partially or totally. The product is dried and gelled to give PVC Coating.

Figure 1:
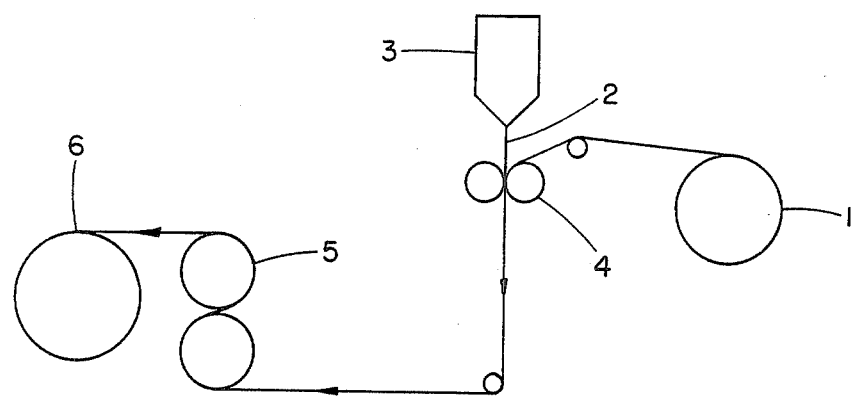
FIG. 1 illustrates a method of film spraying according to the present invention; Numeral 1 is a PP Non-Woven Fabric; Numeral 2 is a PVC Film Layer; Numeral 3 is a T-Mold; Numeral 4 is an Adhesion Roll; Numeral 5 is a Cooling Roll; Numeral 6 is the Semi-finished product.
Figure 2:
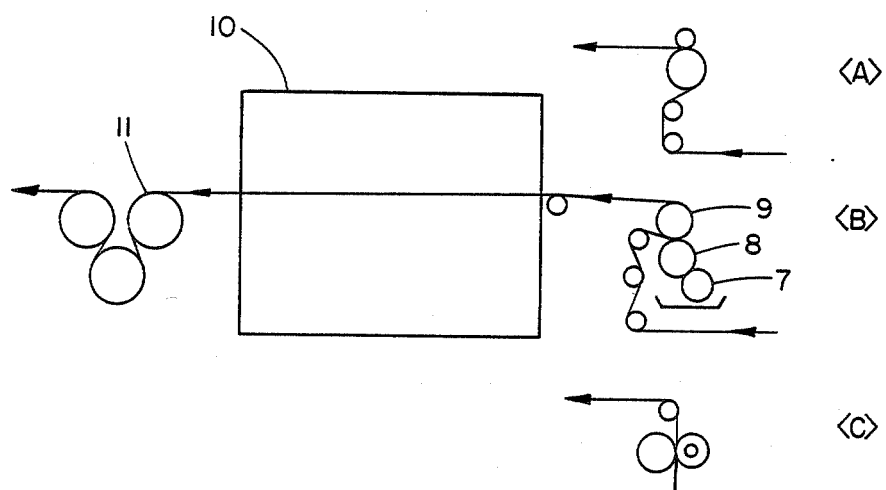
FIG. 2 illustrates a method of coating according to the present invention; Numeral 7 is a Feeder Wheel; Numeral 8 is the Embossed Coating Roll; Numeral 9 is the backing wheel; Numeral 10 is a Drying Oven; Numeral 11 is a Cooling Wheel-A: Wheel Type coating; B: Embossed Coating; C: Rotary Screen Coating.
Figure 3:
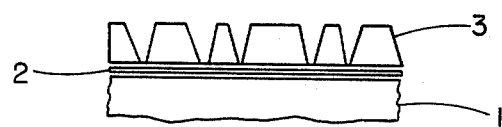
FIG. 3 illustrates the structure of the finished product according to the present invention: (1) PP Non-Woven; (2) PVC Film Layer; (3) Coating Plastisol Layer.

The process of manufacture is described in FIGS. 1 and 2:

Granules for PVC Film for Spreading-Film Extrusion by T-Mold PP Spun Non-Woven—PVC Film for Spreading, Overall PVC Plasticizer Preparation—PVC Plastisol Coating, partially or totally—Heating/Gelling—Cooling—Surface treatment by Embossing—Finished product.

The PP Non-Woven is made of PP resin, fiber-grade. The PP resin is heated and melted, sprayed by a spinning head to form continuous filaments which are evenly sprayed on a web to form a sheet, bonded to form a non-woven sheet with thermal embossing roll. The density and thickness of the non-woven sheet is controlled by spraying speed to meet different quality requirements, and different dyes can be added to form PP non-woven of different colors.

The granules for film spreading are prepared with a particular formula to suit extrusion with melting and T-mold. The components, after mixing in the proper proportions, are granulated by PVC granulator to suit film spreading.

The Non-woven PP sheet is placed on the feeder of a film spreading machine and extended to a T-mold. The granules for film spreading are heated to 190°–210° C., extruded by the T-mold to form a film covering the PP non-woven.

The plastisol prepared in compliance with the particular formulation is then coated on the PP non-woven sheet. The plastisol is adhered to a rubber feeder roll and then transferred to an embossed coating roll which coats the plastisol on the film covered non-woven sheet. The non-woven sheet after coating is sent into a drying oven with a temperature of 100°–150° C. for drying and gelling. After cooling and setting, it is finished or embossed to form a coated plastic sheet made of non-woven PP sheet (see FIG. 1 and 2).

A wide choice of non-woven PP with thickness from 0.1 mm to 0.6 mm and density from 14 g/m$^2$ to 100 g/m$^2$ can be used to meet the thickness requirement of the finished product. The proportion of VC-VAC copolymer in the granules for the film to be spread may be adjusted within a range of 0–50 parts per 100 parts of resin. The thickness of the film to be spread is from 0.02 mm to 0.15 mm to meet different requirement.

The preferred embodiments according to the present invention is described below:

(1) Non-woven PP sheet of 75 g/m$^2$ is used. It is entirely sprayed to apply a film of 0.1 mm by extrusion of the granules of PVC film at 190° C. by means of a T-mold to form a base sheet with a thickness of 0.45 mm. The base sheet is then coated with a PVC plastisol to a thickness of 0.15 mm by means of the embossed coating roller. After drying and gelling in a drying oven at a temperature of 100° C.–150° C., cooling and setting, the surface is subjected to a finishing treatment with a surface treating agent. Finally, it is subjected to inspection, cutting and packing for form the finished product with a thickness of 0.6 mm at 50 yards per roll for further processing by handbag manufacturers.

(2) Non-woven PP sheet of 50 g/m$^2$ is used. It is entirely sprayed to apply a film of 0.15 mm by extrusion of granules for PVC film spreading at 200° C. by means of a T-mold in order to form a base sheet with a thickness of 0.35 mm. The base sheet is then coated with a PVC plastisol to a thickness of 0.20 mm by means of a wheel type coating machine. After drying and gelling in a drying oven at a temperature of 100° C.–150° C., cooling and setting, a surface finishing treatment is applied by means of embossing and printing. Finally, it is inspected, cut and packed to rolls of 60 yards each and has a thickness of 0.5 mm–0.55 mm for further processing by handbag/luggage manufacturers.

(3) PP non-woven sheet of 75 g/m$^2$ is used. Water-based or oil-based ink or paste is applied to the surface completely, or it is dyed to fill its pores in order to form a base sheet 0.4 mm thick. A rotary screen coating roller is then used to apply PVC plastisol in a certain pattern to form embossed pattern. After drying and gelling in a drying oven at a temperature of 100° C.–150° C., cooling and setting, it is inspected, cut and packed in rolls of 50 yards each and has a thickness of 0.5 mm–0.6 mm for further processing by handbag manufacturers.

I claim:

1. A water impermeable and water repellent coated plastic sheet made of a base non-woven, polypropylene (PP) sheet, an intermediate layer of a polyvinylchloride (PVC) film and an uppermost layer of polyvinyl chloride plastisol coating, said (PP) non-woven sheet being made of fiber-grade (PP) resin by melting and spray spinning, said (PVC) intermediate layer being composed of 50-100 parts (PVC) resin, 0–50 parts per 100 parts of resin of of VC-VAC copolymer (vinyl chloride-vinyl acetate copolymer), 50-100 parts per 100 parts of resin of plasticizer, 3-9 parts per 100 parts of resin of stabilizer, 0-1 parts per 100 parts of resin of lubricant, and 0-6 parts per 100 parts of resin of dye; and the PVC plastisol for the coating is composed of 60-100 parts per 100 parts of resin of PVC resin, 0-40 parts per 100 parts of resin of thermoplastic rubber, 0-100 parts of resin of stabilizer, 0-50 parts per 100 of resin of filler and 5-20 parts per 100 parts of resin of dye.

2. The coated plastic sheet according to claim 1, wherein the base sheet is a (PP) non-woven sheet with a thickness of 0.1 mm–0.6 mm and a density of 14–100 g/m$^2$ and is prepared by melting, spray spinning and thermosetting.

3. The coated plastic sheet according to claim 1, wherein the plastisol coating is applied by a wheel type coating machine over the entire surface of the polypropylene sheet coated with the polyvinyl chloride (PVC) coating.

4. The coated plastic sheet according to claim 1 wherein the plastisol coating is applied partially with a coating roller, or rotary screen coating roller, then dried and gelled at 100° C.–150° C., cooled and set, and finally the surface is finished by printing or dyeing.

5. The coated plastic sheet according to claim 1, wherein the intermediate layer is a film 0.02 mm–0.15 mm thick formed by spreading a film extruded from a (PVC) resin at 190° C. by means of a T-mold whereby the pores of the (PP) non-woven sheet are filled.

6. The coated plastic sheet according to claim 5, wherein said (PVC) coating is (PVC) resin with 10-40 parts per 100 parts of resin of thermoplastic rubber.

7. A water impermeable and water repellent coated plastic sheet made of a base non-woven, polypropylene (PP) sheet, an intermediate layer of a water based or oil-based ink or paste and an uppermost layer of polyvinyl chloride plastisol coating, said (PP) non-woven sheet being made of fiber-grade (PP) resin by melting and spray spinning, said (PVC) plastisol for the coating is composed of 60-100 parts per 100 parts of resin of (PVC) resin, 0-40 parts per 100 parts of resin of thermoplastic rubber, 0-100 parts per 100 parts of resin of plasticizer, 1-5 parts per 100 parts of resin of stabilizer, 0-50 parts per 100 parts of resin of filler and 5-20 parts per 100 parts of resin of dye.

8. The coated plastic sheet according to claim 7 wherein said plastisol coating is embossed.

* * * * *